US000001847H

United States Statutory Invention Registration [19]

[11] Reg. Number: H1,847

[45] Published: Apr. 4, 2000

Fliflet et al.

[54] MAGNICON AMPLIFIER OPERATED AT THE SECOND HARMONIC OF THE CYCLOTRON FREQUENCY

[75] Inventors: Arne W. Fliflet, Alexandria, Va.; Steven H. Gold, New Carrollton, Md.

[73] Assignee: United States of America, Washington, D.C.

[21] Appl. No.: 08/594,557

[22] Filed: Jan. 31, 1996

[51] Int. Cl.[7] ..... H01J 25/78

[52] U.S. Cl. ..... 330/45; 315/5.27; 315/5.35; 315/5.43; 315/5.28

[58] Field of Search ..... 315/5.43, 5.24, 315/5.25, 5.26, 5.27, 5.28, 5.29, 5.35, 5; 330/44, 45

[56] References Cited

U.S. PATENT DOCUMENTS

| | | | |
|---|---|---|---|
| 2,409,179 | 10/1946 | Anderson | 315/5.27 X |
| 4,004,181 | 1/1977 | Kervizic et al. | 315/5.43 X |
| 5,502,353 | 3/1996 | Mako et al. | 315/5.26 X |

*Primary Examiner*—Bernarr E. Gregory

*Attorney, Agent, or Firm*—Thomas E. McDonnell; George Jameson

[57] ABSTRACT

A high power, highly efficient, phase-stable frequency-multiplying magnicon microwave amplifier is disclosed having efficiencies that exceed 60%. The magnicon amplifier has an output cavity that receives an electron beam that is deflection modulated by the drive, gain and penultimate cavities of the magnicon amplifier. The output cavity is dimensioned so as to operate in a $TM_{m10}$ mode, where m is an even integer greater than two. The output cavity is selected to preferably have an operating frequency $f_o$ which is twice the cyclotron frequency $f_c$ of the output cavity.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MAGNICON AMPLIFIER OPERATED AT THE SECOND HARMONIC OF THE CYCLOTRON FREQUENCY

BACKGROUND OF THE INVENTION

The present invention relates to a magnicon amplifier and, more particularly, to a magnicon amplifier that provides deflection modulation and has an output cavity operated at the second harmonic of the cyclotron frequency of the output cavity.

Communication, radar and particle accelerator applications have a need for a combination of high power microwaves at shorter wavelengths than are available from conventional microwave tubes. High power klystrons efficiently operating in a frequency range of about 2.85 GHz serve well as a high power microwave device, but do not operate well in frequencies greater than about 10 GHz. The magnicon amplifier is envisioned as a replacement for the high power klystrons.

The magnicon is a scanning-beam microwave amplifier that deflection modulates an electron beam from its insertion point into the magnicon and continues such modulation into the output cavity of the magnicon and does so in synchronization with the phase of the microwaves being propagated by the magnicon. The operation of the magnicon is known in the art and further details may be found in U.S. Pat. Nos. 3,885,193 (+193) and 4,019,088 (+088) both of G. I. Budker and in the technical article "Gyrocons and Magnicons: Microwave Generator with Circular Deflection of the Electron Beam," of Oleg A. Nezhevenko published in *IEEE Transactions of Plasma Science* Vol. 22, No. 5, October 1994. Both of the patents +193 and +088 and the technical article of Oleg A. Nezhevenko are herein incorporated by reference. The synchronization of the magnicon provides an extremely efficient interaction in the output cavity between the electron beam and microwave signal introduced into the magnicon, since theoretically every electron experiences identical decelerating radio frequency (rf) fields.

The magnicon, because of its fast-wave output cavity and its phase-synchronization interaction, provides higher power and higher efficiency at higher frequencies relative to known high power klystrons. Although the magnicon serves well its intended purpose, further improvements of the magnicon are desired. More particularly, it is desired that the quality of the electron beam created by a magnicon be improved, thereby, resulting in attendant higher efficiencies and higher operating frequencies.

OBJECTS OF THE INVENTION

Accordingly, it is a primary object of the present invention to provide a magnicon that provides for an electron beam having improved characteristics and resulting in providing a magnicon having higher operating efficiencies, as well as having higher operating frequencies, so as to serve the needs of radar, communication and linear accelerators.

Another object of the present invention is to reduce the magnetic field needed to operate a magnicon so as to lower the dissipation of the electric power needed to operate such a magnicon and, thereby, lowering the operating cost of the magnicon.

A still further object of the present invention is to provide a magnicon producing an increased electron beam diameter and, thereby, lowering the current density of the beam needed to be supplied to the magnicon.

Further still, it is an object of the present invention to reduce the level of the electric fields in the gain cavities of the magnicon so as to reduce the possibility of electrical breakdowns therein as well as reduce the wall heating thereof.

SUMMARY OF THE INVENTION

The present invention is directed to a magnicon amplifier having an output cavity with an operating frequency which is twice the cyclotron frequency of the output cavity so as to improve the electron beam produced by the deflection modulation of the magnicon.

The magnicon amplifier comprises means for producing a linear electron beam, a drive cavity, at least one gain cavity, a penultimate cavity, an output cavity, and a magnet. An input coupler introduces a microwave signal to the magnicon amplifier and has first and second ends with the first end receiving a microwave signal having a frequency, $f_s$. The drive cavity is connected to the second end of the input coupler and receives the microwave signal $f_s$. The frequency of the signal, $f_s$, should be within the bandwidth of the cavity. The microwave signal $f_s$ creates microwave fields in the drive cavity, which has means for accepting the electron beam. The drive cavity microwave fields, comprised of the microwave signal $f_s$, deflection modulate the electron beam, and the modulated beam serves as the output of the drive cavity. There is at least one gain cavity which receives the deflection modulated electron beam of the drive cavity that excites a second microwave field, comprised of the microwave signal $f_s$, that further deflection modulates the electron beam. The penultimate cavity receives the at least twice modulated electron beam at the output of the gain cavity that excites a third microwave field, comprised of the microwave signal $f_s$, that still further deflection modulates the electron beam. The output cavity has a predetermined cyclotron frequency $f_c$ and receives the deflection electron beam from the penultimate cavity. The output cavity is dimensioned so as to operate in a $TM_{m10}$ mode, where m is an even integer greater than two (2). The output cavity has a preselected output frequency $f_o$ which is within the bandwidth of the output cavity and which is equal to m times the microwave frequency $f_s$ and which is also about m/2 times the cyclotron frequency $f_c$ of the output cavity. The magnet encompasses all of the drive, gain, penultimate and output cavities. The drive, gain and penultimate cavities are dimensioned to provide deflection modulation of the electron beam and are further dimensioned and excited to operate in a $TM_{110}$ mode.

BRIEF DESCRIPTION OF THE DRAWINGS

These and other objects, features and advantages of the present invention, as well as the invention itself, will become better understood by reference to the following detailed description when considered in conjunction with the accompanying drawings, wherein like reference numbers designate identical or corresponding parts throughout the several views and, wherein.

DETAILED DESCRIPTION OF THE PREFERRED EMBODIMENTS

Figure 1:
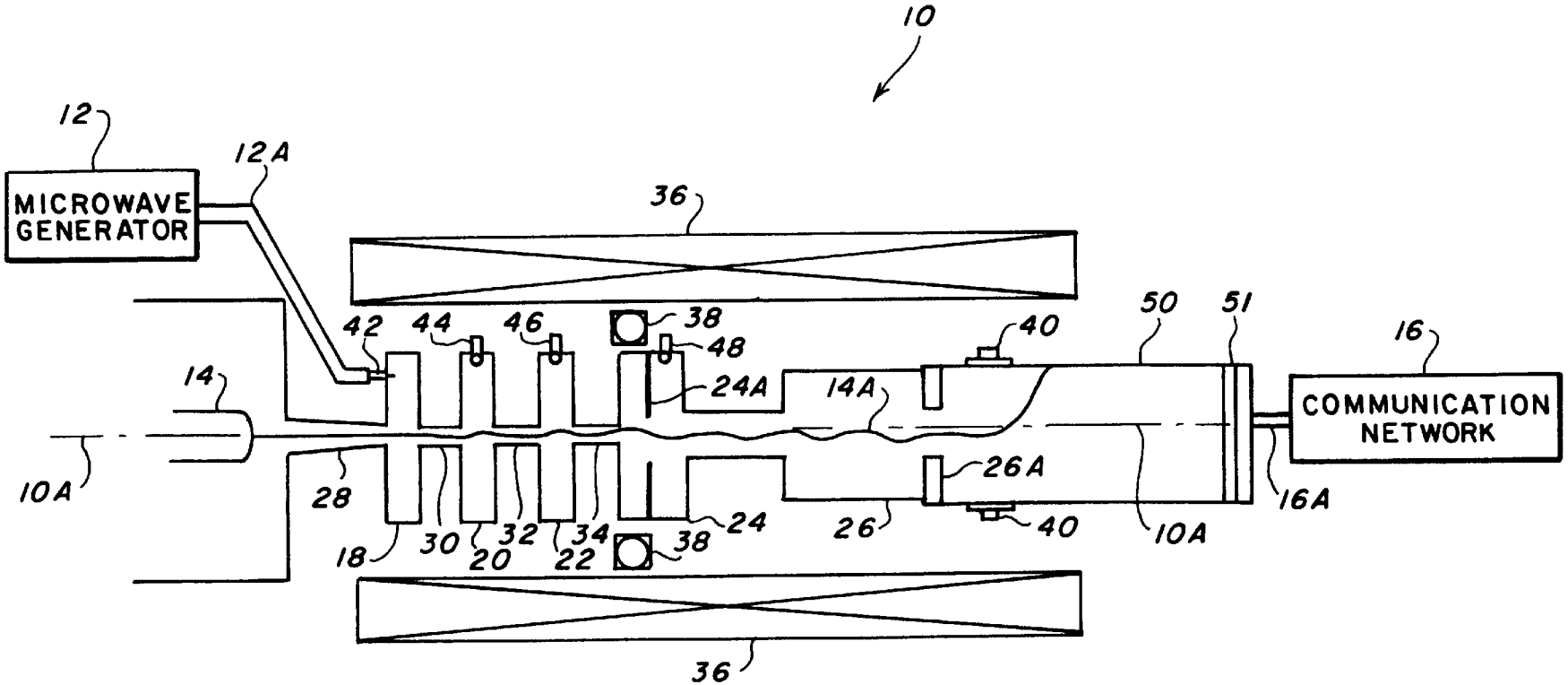
PRIOR ART FIG. 1
FIG. 1 is a schematic of a prior art magnicon amplifier.

With reference to the drawing, FIG. 1 illustrates a prior art magnicon amplifier 10 which may be first described in order to more fully appreciate the principles of operation of the present invention. The magnicon amplifier 10 is a high powered microwave device making use of "deflection modulation," also referred to as the scanning electron beam principle both known in the art. The magnicon amplifier 10 has a cylindrical axis 10A and receives a microwave signal having a predetermined frequency, $f_s$, generated by a microwave generator 12 and introduced to the magnicon amplifier 10 by way of waveguide 12A. An electron gun 14 of the magnicon amplifier 10, which may comprise a plasma cathode, generates a linear electron beam. Typical electron beam parameters produced by the electron gun 14 are 500 kV, 200A, 5.5 mm diameter with a ~300 nsec voltage flat-top and a ~$10^{-2}$ Hz repetition rate. The magnicon amplifier 10 deflection modulates the electron beam generated by the electron gun 14 with the microwave signal generated by the microwave generator 12 and provides an output that is directed to a communication network 16 by way of waveguide 16A, or to other applications of primary interest to the present invention, such as radar or the powering of linear accelerators. The magnicon amplifier 10 comprises a plurality of elements arranged as shown in FIG. 1 and tabulated in Table 1.

TABLE 1

| REFERENCE NO. | ELEMENT |
|---|---|
| 18 | DRIVE CAVITY |
| 20 | GAIN CAVITY |
| 22 | GAIN CAVITY |
| 24 | PENULTIMATE CAVITY |
| 26 | OUTPUT CAVITY |
| 26A | OUTPUT CAVITY IRIS |
| 28 | BEAM TUNNEL |
| 30 | BEAM TUNNEL |
| 32 | BEAM TUNNEL |
| 34 | BEAM TUNNEL |
| 36 | ELECTRICALLY POWERED MAIN MAGNET |
| 38 | TRIM MAGNET |
| 40 | CURRENT SHUNT |
| 42 | INPUT COUPLER |
| 44 | RF PICKUP |
| 46 | RF PICKUP |
| 48 | RF PICKUP |
| 50 | OUTPUT WAVEGUIDE AND COLLECTOR |
| 51 | OUTPUT WINDOW |

The cavities 18, 20, 22, 24 and 26 are fabricated from stainless steel, with a thin flash of copper to decrease ohmic losses and are held together with bolts, using VITON O-rings to maintain vacuum seals and copper gaskets to maintain rf seals. Here "VITON" is a trade name, owned by E.I. dupont de Nemours Company, having the generic termoinology of "Fluorocarbon Rubber".

The magnicon amplifier 10 consists of a number of deflection cavities that include the drive cavity 18, the gain cavities 20 and 22, and the final deflection cavity or penultimate cavity 24. The penultimate cavity 24 may consist of several sections, coupled by an iris 24A, known in the art, to reduce the rf fields required to spin the electron beam up to a high transverse velocity pitch ratio $\alpha$. The drive cavity 18, gain cavities 20 and 22 and the penultimate cavity 24 are dimensioned and excited to produce an rf field in the fundamental mode $TM_{110}$ and are separated by beam tunnels 30, 32 and 34. The cavities 18, 20, 22, and 24 spin up a relatively solid on axis electron beam produced by the electron gun 14 to high transverse velocity. This condition may be expressed using the velocity ratio $\alpha$ as follows:

$$\alpha \equiv v_{\perp}/v_z \geqq 1$$

where $v_{\perp}$ and $v_z$ are the velocity components transverse and parallel, respectively, to the axial magnetic field created by main magnet 36 and the trim magnet 38 arranged as shown in FIG. 1. The parameter "$\alpha$", which is a ratio of the perpendicular to parallel velocity of the electron beam, can also be expressed as the ratio of perpendicular to parallel momentum, since the perpendicular momentum is proportional to the perpendicular velocity and the parallel momentum is proportional to the parallel velocity. The use of magnetic devices, such as main magnet 36 and trim magnet, 38 is known in the art and need not be further described; however, if desired reference may be made to U.S. Pat. Nos. 4,393,332; 4,445,070 and 4,897,609, for further details and all of which U.S. patents are herein incorporated by reference.

The drive cavity 18 and gain cavities 20 and 22 and each section of the penultimate cavity 24 are selected so that the electron beam transit time of these cavities is half an rf period. The cavities 18, 20, 22 and 24, employing a rotating $TM_{110}$ mode, produce a gyrating electron beam generally designated in FIG. 1 by reference number 14A, whose centroid rotates about the cylindrical axis 10A at the signal frequency, that is, the frequency, $f_s$, preselected, in a manner known in the art, for the drive cavity 18.

As illustrated in FIG. 1, the main magnet 36 encompasses all of the drive (18), gain (20 and 22) and penultimate (24) cavities and the output cavity 26. The main magnet 36, for the embodiment of FIG. 1, is arranged so as to supply a magnetic field to the output cavity 26 which is substantially equal to that of the magnetic field supplied to the cavities 18, 20, 22 and 24.

In steady-state operations, the electron trajectories, specifically those of the electron beam 14A of FIG. 1, associated with all of the electrons that enter the magnicon amplifier 10 at a single point in time are identical with those entering at any other point in time, except for an overall spatial phase factor. This spatial phase factor advances in synchronization with the phase of the rotating RF waves within the cavities 18, 20, 22, 24 and 26. That is, the electron trajectories are invariant in time when viewed in the frame rotating in a direction of the electron gyromotion at the frequency $f_s$, that is the frequency of the microwave signal generated by the microwave generator 12. The term "gyromotion" is sometimes used to describe the motion of electrons in a gyrotron which is a fast wave tube in which electrons in a beam are given spiraling cyclotron motions in an axial magnetic field. Further description of the gyrotron, as well as "slow wave" and "fast wave" devices, may be found in U.S. Pat. No. 4,513,223, herein incorporated by reference.

The electron trajectories being invariant in time is one of the main advantages of this deflection modulation technique of magnicon amplifier compared to that of conventional klystrons or gyroklystrons. The output cavity 26 of magnicon 10 extracts principally the transverse electron momentum in a gyroresonant "fast-wave" interaction that extends over several wavelengths. The output cavity 26 employs a mode, to be further described, that rotates synchronously with the electron beam centroid motion, making possibly a high efficient output interaction in the output cavity 26 of the electron beam with the microwave signal at a frequency two (2) times the frequency $f_s$. The electron beam interacts both with the microwave signal and with the axial magnetic field produced by magnets 36 and 38. The highly efficient output interaction advantageously does not require electron beam bunching, such as that found in klystrons and gyroklystrons.

In order to advantageously allow the magnicon amplifier 10 to operate with frequencies of operation (>5 GHz), it is desirable to operate the output cavity 26 at twice the frequency, $f_s$, of the cavities 18, 20, 22 and 24. For such an operation, the output cavity 26 employs a rotating $TM_{m10}$ mode, where m is the azimuthal mode index and is an integral >1. Such modes rotate at $m^{-1}$ times the rf frequency $f_s$, thus preserving the phase synchronization between the electron beam and the rf mode related to the microwave signal generated by the microwave generator 12. This synchronization permits cavities 18, 20, 22 and 24 having relatively larger dimensions and lower rf fields therein than would otherwise be required if the entire magnicon amplifier 10, including the output cavity 26, operated at the output frequency, that is, the frequency, $f_o$, of the output cavity 26 which is a multiple of the frequency, $f_s$.

However, a penalty of the phase synchronization at higher multiples of the drive frequency is lowered efficiency of the magnicon amplifier 10, due to weaker rf fields near the axis 10A within the output cavity 26, for m>1. The magnicon amplifier 10 has incorporated the value of m=2, so that the output cavity 26 operates in the $TM_{210}$ mode generating an output frequency, $f_o$, which is twice that of the drive frequency, $f_s$. An advantage of this frequency-doubling configuration ($f_o$=2$f_s$) is that the same magnetic field can be employed in the cavities 18, 20, 22 and 24 as in the output cavity 26. This is because the magnetic field in the cavities 18, 20, 22 and 24 correspond to a gyrofrequency, herein termed the cyclotron frequency, $f_c$, which is approximately twice the operating frequency ($f_s$) of the deflection cavities. The interaction between the magnetic field and the gyrofrequency is more fully described by M. Karliner, et al in the technical article "The Magnicon—An Advanced Version of the Gyrocon," published in *Nucl. Instrum. Methods Phys. Res.,* Vol. A269, pp. 459–473, 1988, and herein incorporated by reference. The operation of the output cavity corresponds to a gyrofrequency approximately equal to the operating frequency as more fully described by O. A. Nezhevenko, in the technical article, "The Magnicon: A New RF Power Source for Accelerators," published in *Conference Record—1991 IEEE Particle Accelerator Conference*, edited by L. Lizama and J. Chew (IEEE, New York, 1991), Vol. 5, p. 2933–2942, and herein incorporated by reference. In other words, the output cavity 26 interaction between the electron beam 14A, the microwave signal introduced into the magnicon amplifier and the axial magnetic field supplied by main magnet 36 and trim magnet 38, takes place at the first harmonic of the cyclotron frequency associated with the output cavity 26. This interaction is sometimes referred to herein as "cyclotron frequency interaction." The present invention does not operate its output cavity in the mode of $TM_{210}$, but rather operates in the mode of $TM_{m10}$ with m being an even integer with values greater than 2 and may be further described with reference to FIG. 2 illustrating a magnicon amplifier 52.

Figure 2:
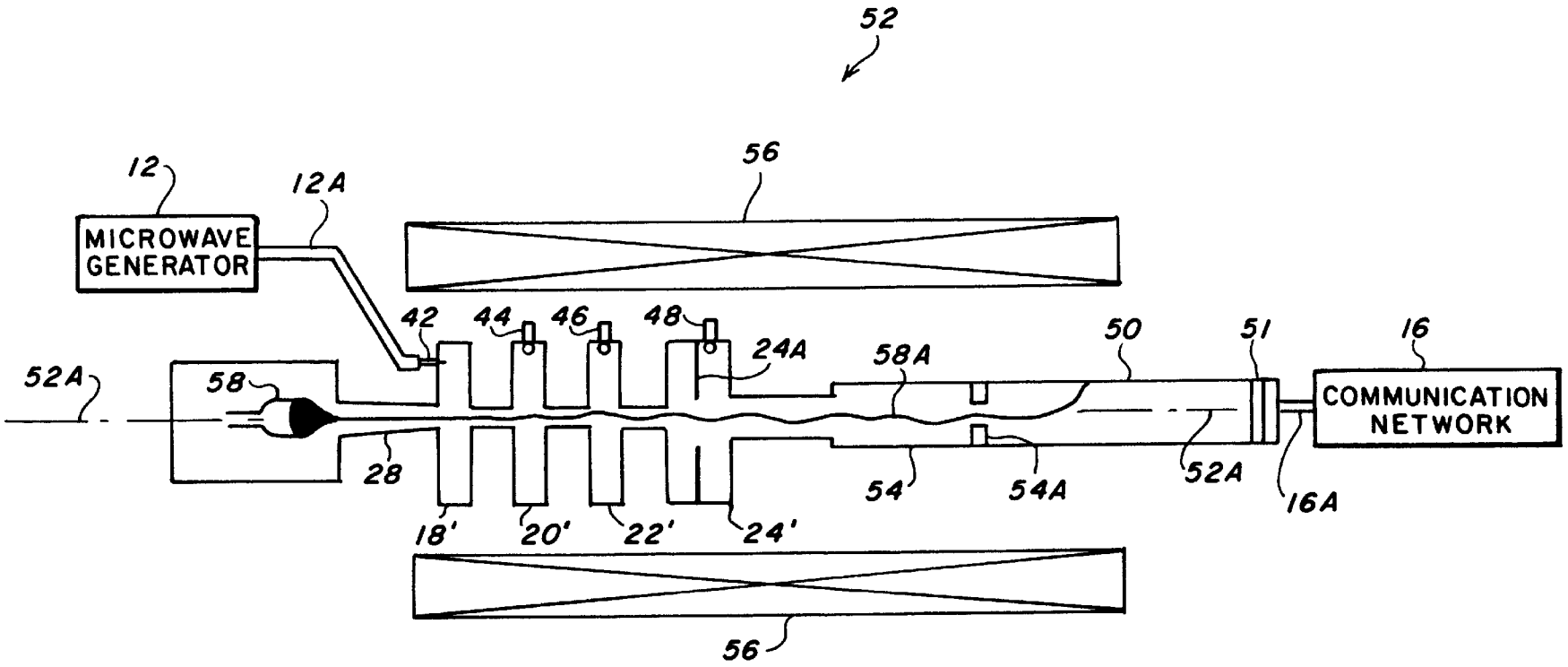
FIG. 2 is a schematic of the magnicon amplifier of the present invention.

The magnicon amplifier 52 of FIG. 2 is quite similar to the magnicon amplifier 10 of FIG. 1, except that its output cavity 54 operates in a $TM_{m10}$ mode with m preferably equal to four (4) rather than two (2), its output frequency $f_o$ is four (4) times $f_s$ rather than two (2) times $f_s$, and preferably the magnicon amplifier 52 uses a klystron electron gun 58 that produces a linear electron beam 58A on the cylindrical axis 52A of the magnicon amplifier.

The magnicon amplifier 52 of FIG. 2 preferably makes use of even values of m>2 associated with the mode of operation of the output cavity 54, such as m=4 or m=6, provided that the output cavity 54 is operated in the m/2 harmonic of the cyclotron frequency of the output cavity 54, instead of the first harmonic of the cyclotron frequency of the output cavity 26 as selected for the magnicon amplifier 10 of FIG. 1. The operation of m/2 harmonic allows an approximately constant magnetic field through all of the cavities 18', 20', 22' and 24', as well as the output cavity 54. The preferred example, generally illustrated in FIG. 2, is for m=4 so that the cavities 18', 20', 22' and 24' operate in the $TM_{110}$ mode at one-fourth (¼) the frequency $f_o$ of the output cavity 54, while the output cavity 54 itself operates in the $TM_{410}$ mode. The cavities 18', 20', 22' and 24', schematically illustrated in FIG. 2, in actuality are twice as large as the cavities 18, 20, 22 and 24 of FIG. 1 while cavity 54 of FIG. 2 is somewhat larger than cavity 26 (1.48 times larger) of FIG. 1 if the output cavities (54 and 26) are at the same frequency $f_o$. The output cavity 54 of FIG. 2 requires a lower magnetic field than that of output cavity 26 of FIG. 1, because cavity 54 operates at higher harmonics of the cyclotron frequency $f_c$.

The operational parameters of the magnicon amplifier 52 may consist of a microwave generator 12 that generates a microwave signal having a frequency, $f_s$, of 2.85 GHz which is applied to the input coupler 42 having first and second ends, with the first end receiving the microwave signal $f_s$ of 2.85 GHz which is directed into the drive cavity 18'. The drive cavity 18' is connected via waveguide 12A to the second end of the input coupler 42 and receives the microwave signal $f_s$. This frequency, $f_s$ is also applicable, in a manner known in the art, to the gain cavities 20' and 22' and the penultimate cavity 24'. The frequency, $f_0$, that is, the output frequency of the output cavity is 11.4 GHz which is equal to 4$f_s$. Further, the frequency, $f_o$, is twice the cyclotron frequency $f_c$ of the output cavity 54.

The drive cavity 18' has a beam tunnel 28 for receiving the electron beam generated by the klystron gun 58 and causes a first output of the electron beam to be deflection modulated by the microwave signal of 2.85 GHz and interact with the axial magnetic field generated by the main magnet, electromagnet or permanent magnet 56.

The gain cavity 20' has means for receiving and amplifying the electron beam deflection modulated by the drive cavity 18'. The electron beam excites a second microwave field causing the electron beam to be further deflection modulated and interact with the axial magnetic field generated by main magnet 56. This now twice deflection modulated electron beam is preferably directed into the second cavity 22' where it again excites a third microwave field causing the electron beam to be still further reflection modulated and be directed into the penultimate cavity 24'.

The penultimate cavity 24' operates in a manner similar to cavities 18', 20' and 22' and causes the electron beam to be further still deflection modulated by the microwave signal of 2.85 GHz and interact with the axial magnetic field generated by the main magnet 56. The deflection modulated electron beam is directed to the output cavity 54.

The output cavity 54 receives the electron beam that has encountered deflection modulation of cavities 18', 20', 22' and 24' and is extracted through the iris 54A, allowing the electron beam to strike the wall of the output waveguide and collector 50, as shown in FIG. 2. The microwave signals within the output cavity 54 are also extracted through the iris 54A and reach the window 51 to be coupled to the communication network 16 by way of the waveguide 16A. The output cavity 54 has a preselected output frequency $f_o$ which is four (4) times that of the microwave signal $f_s$=2.85 GHz and about twice that of the cyclotron frequency $f_c$.

The advantage of selecting the mode $TM_{110}$ for the cavities 18', 20', 22' and 24' and the mode $TM_{410}$, for the output cavity 54, is that the cavities 18', 20', 22' and 24' can be larger and have lower rf fields as compared to magnicon amplifiers having cavities 18, 20, 22 and 24 that are operated at either 11.4 GHz which is equal to output frequency $f_o$ (m=1) or at 5.7 GHz which is half the operating frequency (m=2). Further, the selection of these modes $TM_{110}$ and $TM_{410}$ for the cavities 18', 20', 22' and 24' and output cavity 54, respectively, allows for the use of a larger (to be further described) electron beam diameter for electron beam 58A (FIG. 2) as compared to that of electron beam 14A (FIG. 1) without any loss of operating efficiency of the magnicon amplifier 52.

In the magnicon amplifier 52 of FIG. 2, the output cavity 54 cyclotron frequency interaction takes place at the second harmonic of the output cavity 54 cyclotron frequency. To the knowledge of the present inventors, no previous magnicon amplifier has made use of a harmonic cyclotron frequency interaction in the output cavity 54. An essential feature of the magnicon amplifier 52 of FIG. 2, is to choose, in a manner known in the art, a magnetic field value created by the main magnet 56, such that the cyclotron frequency $f_c$ in the output cavity 54 is detuned downward by about 15% from the operating output frequency $f_o$. In other words, the cyclotron frequency is about 15% less than one-half of the operating frequency $f_o$. The magnetic field value is approximately constant throughout the cavities 18', 20', 22' and 24' and the output cavity 54. The magnetic field value is about one-half of the value that would otherwise be employed for the frequency-doubling magnicon amplifier 10 of FIG. 1. This lower magnetic field value lowers the capital or operating cost of the magnicon amplifier 52, as compared to magnicon amplifier 10, since either cheaper magnets can be used, or the same magnets can be operated at a lower field so as to cause the dissipation of less electrical power.

The magnicon amplifier 52 has an output cavity 54 with an operating output frequency, $f_o$, which is at the fourth harmonic of the microwave signal $f_s$, rather than at the first or second harmonic, such as that of the magnicon amplifier 10 of FIG. 1. To provide for this fourth harmonic operation, the magnicon amplifier 52 uses the cyclotron frequency interaction of the second harmonic of the cyclotron frequency of the output cavity 54. All previous magnicon amplifiers, such as magnicon amplifier 10 of FIG. 1, have made use of the cyclotron frequency interaction of the first harmonic of the cyclotron frequency of the output cavity. The magnicon amplifier 52 allows the use of lower magnetic fields, making possible the use of permanent magnets, rather than expensive electrically powered magnets for magnicon devices, such as those magnets used for magnicon amplifier 10 of FIG. 1 operated in the X-band.

The principles of the present invention also allow the doubling of the beam diameter used for a specific operating output frequency, $f_o$, of the output cavity 54 since the maximum beam diameter is controlled principally by the frequency, $f_s$, of the cavities 18', 20', 22' and 24', rather than by the frequency, $f_o$, of the output cavity 54. The doubling of the diameter of the beam in output cavity 54 of FIG. 2 operated at $TM_{410}$ is relative to the diameter of the beam in the output cavity 26 of FIG. 1 operated at $TM_{210}$. The doubling of the diameter of the beam in the output cavity 54 correspondingly decreases the beam current density by a factor of about 4, making the magnicon amplifier 52 compatible with a standard klystron electron gun 58 of FIG. 2 at the same output frequency, rather than requiring a much higher current density, such as the electron gun 14 of the magnicon amplifier 10 of FIG. 1. Furthermore, by using the second harmonic cyclotron frequency interaction ($f_o$ of output cavity 54) at four times the microwave frequency $f_s$, the coupling strength of the output cavity 54 cyclotron frequency interaction with the electron beam 58A is increased compared to that of the first harmonic cyclotron frequency interaction at four times the microwave frequency $f_s$, thereby, reducing the electric fields present on the walls of the output cavity 54 which, in turn, reduces the possibility of electrical breakdown of the cavity 54, as well as reduces the wall heating of the output cavity 54. A comparison between the coupling strength between the prior art magnicon amplifier 10 of FIG. 1 and the magnicon amplifier 52 of FIG. 2 of the present invention may be further described with reference to FIG. 3, which illustrates curves and bar graphs that are tabulated in Table 2 and some of which are indicated by s, which represents the cyclotron harmonic number.

TABLE 2

| REFERENCE NO. | BAR GRAPHS/CURVE |
|---|---|
| 60 | BAR CHART REPRESENTING ELECTRON BEAM FOR FIRST CYCLOTRON HARMONIC INTERACTION (FIG. 1) |
| 62 | BAR CHART REPRESENTING ELECTRON BEAM FOR SECOND CYCLOTRON HARMONIC INTERACTION (FIG. 2) |
| 64 | CURVE REPRESENTING THE FUNDAMENTAL MODE $TM_{210}$, s = 1 |
| 66 | CURVE REPRESENTING FUNDAMENTAL MODE $TM_{410}$, s = 2 |
| 68 | CURVE REPRESENTING FUNDAMENTAL MODE $TM_{410}$, s = 1 |

Figure 3:
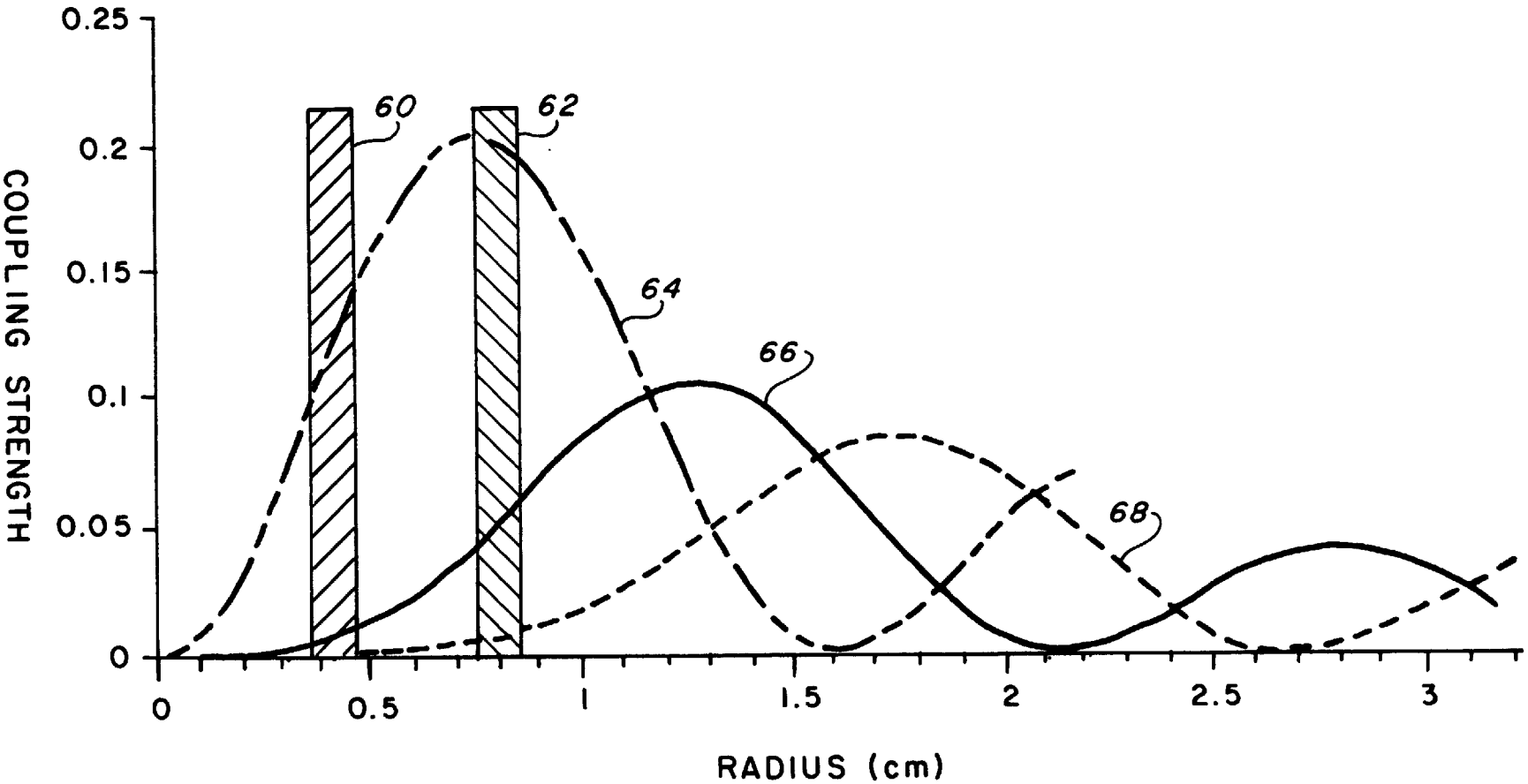
FIG. 3 illustrates a comparison of the coupling strength of the prior art magnicon amplifier of FIG. 1 and the magnicon amplifier of the present invention of FIG. 2.

FIG. 3 has an X axis representative of the electron guiding center radius, which is approximately equal to the electron Larmor radius, given in centimeters, and a Y axis representative of the coupling strength of the output cavity cyclotron frequency interaction. As shown in FIG. 3, the coupling strength increases for two reasons: (1) the order of the Bessel function describing the coupling is lower as seen by comparing the curve 66 ($TM_{410}$, s=2) with the curve 68 ($TM_{410}$, s=1); and (2) the electron guiding center radius is approximately doubled as seen by comparing the graph bar 62 for the magnicon amplifier 52 with the graph bar 60 for the magnicon amplifier 10 of FIG. 1. The doubling of the electron guiding center has been previously referred to as the doubling of the diameter of the electron beam. The stronger coupling also decreases the possibility of mode competition between the synchronous $TM_{410}$ magnicon mode and the non-synchronous gyrotron mode, such as $TE_{121}$, that may be present in the output cavity 54. Such non-synchronous modes, if excited, would lower the efficiency of the cyclotron frequency interaction, or completely suppress it.

As previously mentioned, the second harmonic interaction provided by the magnicon amplifier 52 allows for approximately equal magnetic fields throughout the magnicon amplifier 52, including the cavities 18', 20', 22' and 24', as well as the output cavity 54. This is a favorable magnetic field configuration because it is easily fabricated, and because it does not require doubling the magnetic field in the region of the output cavity 54 compared to the cavities 18', 20', 22' and 24', as would otherwise be required for a fourth harmonic device, such as output cavity 54, operating as defined by the first cyclotron frequency harmonic. If such was the case, increasing the magnetic field would disadvantageously compress the beam, reducing the strength of the interaction in the output cavity 54 and would also disadvantageously increase the electron velocity spread, thereby, lowering the efficiency of the magnicon amplifier 52. The synchronous condition of the magnicon amplifier 52 provides the high mode and the frequency selectivity desired for harmonic operation.

In the practice of the present invention, calculations were performed that manifested efficiencies of up to 61% were possible for operating the output cavity 54 in the fundamental mode $TM_{410}$, thereby, providing a frequency-quadrupling magnicon amplifier 52 operating at 500 kV and 172 amperes (A), with a beam velocity ratio $\alpha$ of 1.5 at the entrance to the output cavity 54 and operating at 3.25 k Gauss (G) in the second harmonic of the cyclotron frequency. Such operation would produce a magnicon amplifier 52 that provides an output power exceeding 50 MW.

Although the hereinbefore given description of the magnicon amplifier 52 was described using m=4 so as to provide for a mode $TM_{410}$ for output cavity 54, the general principles of employing higher harmonics of the microwave frequency, $f_s$, for the magnicon amplifier's operation, combined with a higher harmonics of the cyclotron frequency interaction in the output cavity 54, yields frequencies higher than the fourth harmonic of the microwave frequency, $f_s$, operation of the output cavity 54. Further, harmonics other than the second harmonic of the cyclotron frequency $f_c$ interaction in the output cavity 54 are contemplated by the practice of the present invention.

It should now be appreciated that the practice of the present invention provides for an improved quality electron beam having an increased electron guiding center, while at the same time reducing the magnetic field needed to operate such a magnicon amplifier, thereby, reducing the operating cost thereof.

It should, therefore, be readily understood that many modifications and variations of the present invention are possible within the purview of the claimed invention. It is, therefore, to be understood that, within the scope of the appended claims, the invention may be practiced otherwise than as specifically described.

What we claim is:

1. A microwave amplifier comprising:

(a) a generator of an electron beam;

(b) an input coupler having first and second ends with the first end receiving a microwave signal having a frequency, $f_s$;

(c) a drive cavity connected to the second end of the input coupler and receiving said microwave signal at frequency $f_s$, said drive cavity having means at one end of said drive cavity for accepting said electron beam, said microwave signal exciting a first microwave field at said frequency $f_s$ in said drive cavity, said microwave field deflection modulating said electron beam which exits from a second end of said drive cavity;

(d) at least one gain cavity having means for receiving the deflection modulated electron beam at a first end that excites a second microwave field at the frequency $f_s$ in said at least one gain cavity, said microwave field further deflection modulates said electron beam which exits at a second end of said at least one gain cavity;

(e) a penultimate cavity having means for receiving said deflection modulated electron beam that had exited from said at least one gain cavity at a first end of said penultimate cavity, which excites a third microwave field at said microwave frequency $f_s$ in said penultimate cavity that still further deflection modulates said electron beam which exits at a second end of said penultimate cavity;

(f) an output cavity being configured to have means for receiving the deflection modulated electron beam output of said penultimate cavity and having a predetermined cyclotron frequency $f_c$ and a predetermined operating frequency, $f_o$; said output cavity having dimensions and excited by said deflection-modulated electron beam so as to operate in a $TM_{m10}$ mode, where m is an even integer greater than 2 so that said operating frequency, $f_o$, is equal to m times the microwave frequency $f_s$ and is equal to at least two (2) times said cyclotron frequency $f_c$, said deflection-modulated electron beam exciting a fourth microwave field to produce an output which exits from said microwave amplifier;

(g) magnetic means producing a magnetic field encompassing all of said drive, gain, penultimate, and output cavities;

said,drive, gain and penultimate cavities being dimensioned so as to operate in a $TM_{110}$ mode.

2. The microwave amplifier according to claim 1, wherein said frequency, $f_s$, is about 2.85 GHz, said operating frequency, $f_o$, is about 11.4 GHz, and m is 4 so that said output cavity operates in a $TM_{410}$ mode, and said operating frequency $f_o$ is about twice said cyclotron frequency $f_c$.

3. The microwave amplifier according to claim 1, wherein each of said penultimate and said output cavities includes a respective iris.

4. The microwave amplifier according to claim 1, wherein said output cavity is operated in the $TM_{410}$ mode and said output cavity has a preselected cyclotron frequency $f_c$said electron beam having a voltage of about 500 kV and a current of about 172 amperes (A), and having a velocity ratio $\alpha$ of about 1.5 entering said output cavity and said output cavity and said output cavity having dimensions to operate at the second harmonic of the cyclotron frequency, said cyclotron frequency being determined by a magnetic field of 3.25 k Gauss (G) produced by said magnetic means.

5. A method of operating a magnicon amplifier having a drive cavity, at least one gain cavity, a penultimate cavity and an output cavity operatively connected together, said magnicon amplifier having a magnet supplying a magnetic field to said drive, at least one gain, penultimate and output cavities, said drive, at least one gain and penultimate cavities having a microwave signal at frequency $f_s$ serving as an operating frequency therefor, and said output cavity being configured to have a predetermined cyclotron frequency $f_c$ and an operating frequency $f_o$, said method comprising the steps respectively associated therewith of:

(a) dimensioning said drive, at least one gain and penultimate cavities to provide an operating mode $TM_{110}$; and (b) dimensioning said output cavity to provide an operating mode $TM_{m10}$, where m is an even integer which is greater than two (2).

6. The method of operating a magnicon amplifier according to claim 5, wherein said step (b) further comprises selecting m as being equal to four (4) so that the operating frequency $f_o$ is equal to twice that of the cyclotron frequency $f_c$.

7. The method of operating a magnicon amplifier according to claim 6 further comprises the step of:

(c) adjusting the magnetic field so that said cyclotron frequency $f_c$ is about 15% less than one-half of said operating frequency $f_o$.

* * * * *